A. B. CADMAN.
AUTOMOBILE TRAILER.
APPLICATION FILED JAN. 10, 1917.
1,285,929.
Patented Nov. 26, 1918.
2 SHEETS—SHEET 1.
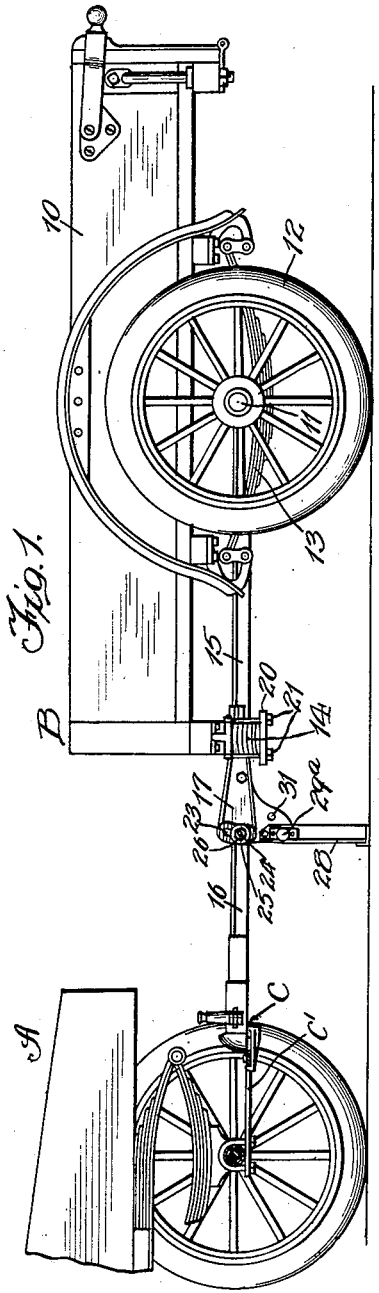
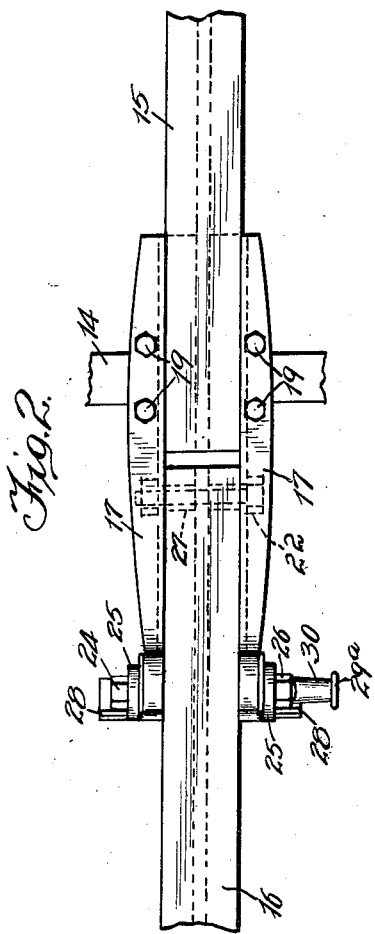
Witnesses:
W. F. Kilroy
Harry R. L. White
Inventor:
Addi Benjamin Cadman
By Miller, Chindahl & Parker
Attys.

A. B. CADMAN.
AUTOMOBILE TRAILER.
APPLICATION FILED JAN. 10, 1917.
1,285,929.
Patented Nov. 26, 1918.
2 SHEETS—SHEET 2.
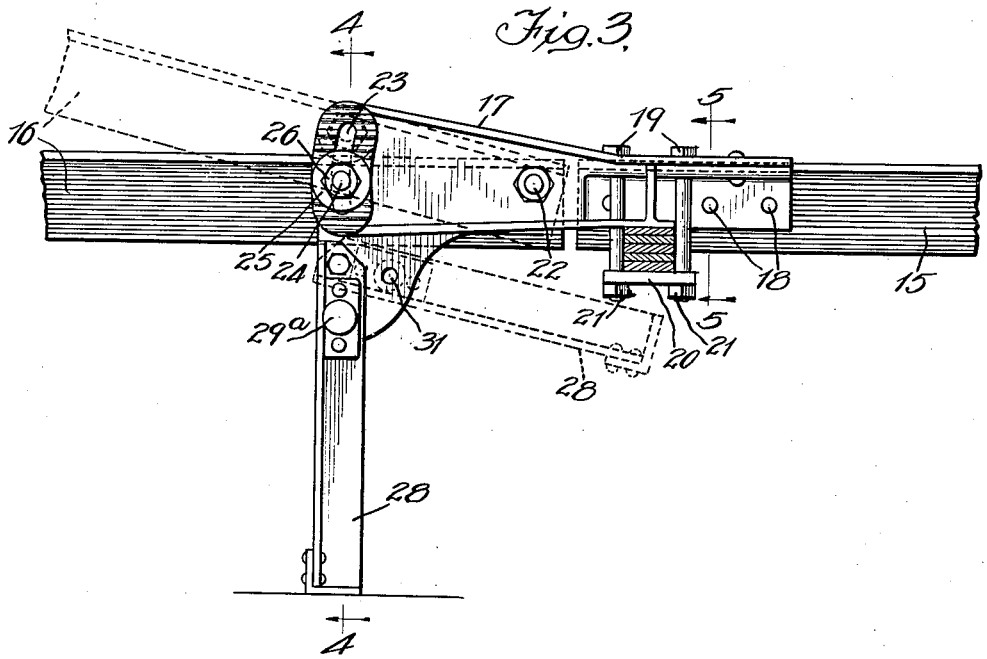
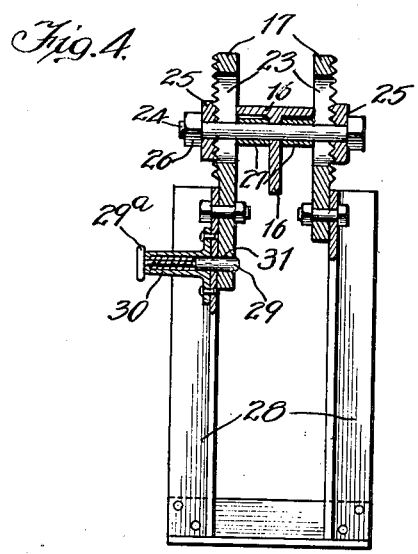
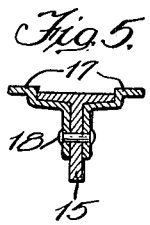
Witnesses:
W. F. Kilroy
Harry R. C. White
Inventor:
Addi Benjamin Cadman
By Miller, Chindahl & Parker
Attys.

UNITED STATES PATENT OFFICE.

ADDI BENJAMIN CADMAN, OF BELOIT, WISCONSIN, ASSIGNOR, BY MESNE ASSIGNMENTS, TO WARNER MANUFACTURING COMPANY, OF SOUTH BELOIT, ILLINOIS, A CORPORATION OF WISCONSIN.

AUTOMOBILE-TRAILER.

1,285,929.  Specification of Letters Patent.  Patented Nov. 26, 1918.

Application filed January 10, 1917. Serial No. 141,510.

*To all whom it may concern:*

Be it known that I, ADDI BENJAMIN CADMAN, a citizen of the United States, residing at Beloit, in the county of Rock and State of Wisconsin, have invented certain new and useful Improvements in Automobile-Trailers, of which the following is a specification.

This invention relates to a trailer vehicle adapted to be coupled on to the rear end of a pulling vehicle, and the invention has especial reference to a two-wheeled trailer cart adapted to be attached to an automobile, although certain features of the invention are not limited thereto.

Such a trailer is usually attached to an automobile by means of a coupling element on the tongue of the trailer and a coöperating coupling element mounted on the rear end of the automobile. In different styles of automobiles the coupling element to be carried thereby is necessarily mounted in different positions and at different heights from the ground which results in a variance of the angle of the trailer tongue with respect to the ground. It is, of course, desirable to maintain the bottom or bed of the trailer level at all times irrespective of the angle at which the tongue lies, and it is one of the objects of the present invention to produce improved means whereby the tongue may be adjustably fixed in various angular positions with respect to the body of the trailer so that the tongue may be coupled to any style of automobile and at the same time the level of the body of the trailer may be maintained.

Another object of the invention is to produce novel means for supporting the tongue on one end of the body of the trailer when detached from the automobile.

A further object is to combine the tongue adjusting means and the supporting means in a simple unitary structure located at the forward end of the trailer body where it will be readily accessible.

Further objects and advantages of the invention will be apparent from the following detailed description.

In the accompanying drawings, Figure 1 is a side elevation of a trailer embodying the features of my invention, the view showing the trailer coupled to the rear end of an automobile. Fig. 2 is a fragmentary plan view illustrating the tongue adjusting and supporting means. Fig. 3 is an enlarged detail side elevation of said adjusting and supporting means. Figs. 4 and 5 are transverse sectional views in the planes of lines 4—4 and 5—5, respectively, of Fig. 3.

Referring to Fig. 1, A indicates the rear portion of an automobile and B a trailer which is attached thereto by coupling means indicated at C. This coupling means may be of any desired construction, but the preferred means may be briefly described as comprising a ball mounted on the rear end of the automobile and a socket carried by the tongue of the trailer and having means to removably hold the ball in the socket. As herein shown, the ball is carried by a yoke C' which is clamped to the rear axle of the automobile, but in different styles of automobiles this ball is mounted in various different ways and at different heights from the ground.

In the preferred embodiment of the invention which is illustrated in the drawings, the trailer is in the form of a two-wheel cart comprising a body 10, having a centrally positioned axle 11 which carries wheels 12, the body being, in the present instance, supported from the axle by means of two side springs 13. Beneath the forward end of the body is a transversely extending spring 14. The tongue of the trailer is in two sections, a rear section 15 and a forward section 16. The rear end of the rear section is rigidly secured to the axle 11, while the forward portion of said rear section is rigidly clamped to the transverse end spring 14. In the present instance, said section is notched to receive said spring.

The means for adjusting the forward tongue section with relation to the rear one comprises two side members 17 which lie at opposite sides of both tongue sections, overlapping the adjacent ends thereof. In the present instance, the tongue sections are composed of T-beams and the rear end of the members 17 are shaped as indicated in Fig. 5 to snugly embrace the forward end of the rear tongue section 15 being rigidly secured thereto as by means of rivets 18. Adjacent to the forward tongue section 16 however the side members are flat on their inner faces to permit up-and-down adjustment of the forward tongue section. The members 17 and the rear tongue section are clamped to the spring 14 by suitable means such as two pairs of bolts 19 at opposite sides, each passing through flanges on the side members and embracing the spring 14, the lower ends of the bolts extending through a bar 20 and carrying nuts 21 beneath said bar whereby the parts of the structure may be rigidly clamped together. The forward end of the body 10 is thus supported on the tongue through the medium of spring 14.

The forward tongue section 16 is pivoted at its rear end to the side members 17 by means of a bolt 22 extending therethrough. Adjacent to their forward ends, the members 17 have opposed arcuate slots 23 concentric with the bolt 22, which slots receive a horizontal bolt 24 passing through and carried by the tongue section 16. The outer faces of the side members adjacent to the slots 23 are roughened or horizontally serrated to coöperate with complementary washers 25 on the ends of the bolt 24. The head of the bolt bears against one washer and a nut 26 on the bolt bears against the other washer, so that when said nut is turned and tightened up the tongue may be clamped to the side members 17 in any desired angular position. If desired, spacer sleeves 27 may be placed on the bolts 22 and 24 between the members 17 and the vertical web of the tongue 16.

The means for supporting the tongue and the forward end of the vehicle when the tongue is uncoupled from the automobile comprises a stand 28, which, in the present instance, is in the form of a rectangular frame, the open upper end of which is pivoted to the two side members 17, and the closed lower end being adapted to bear upon the ground. This frame is arranged to swing upwardly and rearwardly into inoperative position beneath the tongue or the vehicle body, as shown in dotted lines in Fig. 3, so as to be out of the way and to clear obstructions in the road in traveling. Means is provided for holding the stand either in its operative or inoperative position as desired, said means in the present instance comprising a spring-pressed detent 29 slidably mounted in a barrel 30 fixed to one side of the stand, the detent being arranged to engage in either of two holes 31 in one of the side members 17. The detent has a head 29$^a$ on its outer end to be grasped between the fingers for withdrawing the detent from the holes 31. Inasmuch as the stand is carried by the rear section of the tongue, or, in other words, is connected to the main portion of the vehicle, the adjustment of the forward tongue section in nowise affects the supporting function of the stand.

It will be seen that the means herein disclosed affords a simple and convenient adjustment for the tongue to accommodate the positions of the coupling elements on different makes of automobiles, the adjusting and supporting means being located at the forward end of the vehicle body so that they are readily accessible.

The foregoing specific description of the preferred embodiment of my invention is not to be construed as a limitation of the invention to this disclosure. Various modifications and equivalents will be apparent to those skilled in the art and I aim to cover in the appended claims all such equivalents as fall within the scope of the invention.

I claim as my invention:

1. An automobile trailer having, in combination, a body, an axle beneath the midportion thereof, wheels on the axle, two side springs by which the body is supported from the axle, a transverse end spring beneath the forward end of the body, a tongue in two sections, the rear end of the rear section being rigidly clamped to the axle, two spaced side members secured to the forward end of said rear section, said side members and rear section being secured to the midportion of said transverse end spring, the rear end of the front tongue section being pivoted on a horizontal axis between said side members, a horizontal bolt passing through the forward tongue section forwardly of its pivot, said side members having arcuate slots through which said bolt extends, the faces of said side members adjacent to said slots being serrated, serrated washers mounted on the ends of said bolt and coöperating with said faces, and a nut on said bolt by which the front tongue section may be clamped in different angular positions with respect to the rear tongue section and said side members.

2. A vehicle having a tongue pivoted to swing up and down, two spaced side members embracing said tongue, means for clamping the tongue between the said members in adjusted positions, and a stand pivoted at its upper end to said side members and adapted to bear at its lower end upon the ground to support the forward end of the vehicle.

3. A vehicle having a tongue pivoted to swing up and down, two spaced side members embracing said tongue, means for clamping the tongue between the said members in adjusted positions, and a stand pivoted at its upper end to said side members and adapted to bear at its lower end upon the ground to support the forward end of the vehicle, said stand being adapted to swing upwardly into inoperative position, and disengageable means for holding the stand in such inoperative position.

4. A vehicle having two spaced side members mounted thereon, a tongue extending between said side members and pivoted to swing up and down with relation to said members, means for clamping the tongue to the side members in adjusted positions, a stand pivoted at its upper end to said side members and adapted to bear at its lower end upon the ground, said stand being adapted to swing upwardly into inoperative position, and a spring-pressed detent carried by the stand and adapted to engage in either of two openings in one of said side members, whereby to hold the stand either in its operative or inoperative position.

5. In combination with an automobile trailer having a body mounted upon a single pair of wheels, a tongue comprising a rear section rigid with said body and having a pair of spaced side members on its forward end, a forward tongue section, the rear end of which extends between said side members and is pivoted thereto, means for securing said forward tongue section to said side members in different pivotally adjusted positions, and a stand for supporting the forward end of the trailer when uncoupled, said stand being also pivoted to one of the side members.

6. An automobile trailer having, in combination, a body mounted upon a single pair of wheels, a pair of spaced side members carried by the body at the forward end of the latter, an adjustable tongue section having its rear end extending between said side members and pivoted thereto, means for securing said tongue section to said side members in different pivotally adjusted positions, a stand also comprising spaced sides which are pivoted to the respective side members, and means arranged to lock one side of said stand to the adjacent side member in either operative or inoperative position.

In testimony whereof, I have hereunto set my hand.

ADDI BENJAMIN CADMAN.